(12) United States Patent
Han et al.

(10) Patent No.: US 8,802,306 B2
(45) Date of Patent: Aug. 12, 2014

(54) FUEL CELL SYSTEM AND STACK THEREOF

(75) Inventors: Sang-Il Han, Yongin-si (KR);
Kah-Young Song, Yongin-si (KR);
Jin-Hwa Lee, Yongin (KR); Myoung-Ki Min, Yongin (KR); Young-Mi Park, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 526 days.

(21) Appl. No.: 13/164,547

(22) Filed: Jun. 20, 2011

(65) Prior Publication Data

US 2012/0015261 A1 Jan. 19, 2012

(30) Foreign Application Priority Data

Jul. 15, 2010 (KR) .................. 10-2010-0068511

(51) Int. Cl.
*H01M 8/06* (2006.01)
*H01M 8/10* (2006.01)
*H01M 8/04* (2006.01)
*H01M 8/02* (2006.01)

(52) U.S. Cl.
CPC ........ *H01M 8/04119* (2013.01); *H01M 8/1002* (2013.01); *H01M 8/0247* (2013.01); *Y02E 60/521* (2013.01)
USPC ............................ 429/413; 429/408; 429/414

(58) Field of Classification Search
CPC ................................................. H01M 8/04171
USPC .......................................................... 429/413
See application file for complete search history.

(56) References Cited

U.S. PATENT DOCUMENTS

2008/0292927 A1* 11/2008 An et al. .................. 429/22

FOREIGN PATENT DOCUMENTS

| JP | 1998-270066 A | 10/1998 |
|---|---|---|
| JP | 2003-178791 A | 6/2003 |
| KR | 10-0821034 B1 | 4/2008 |
| KR | 10-2009-0087628 A | 8/2009 |

OTHER PUBLICATIONS

KIPO Notice of Allowance (Korean only) in related Korean Application No. KR 10-2010-0068511 dated Nov. 14, 2011.

* cited by examiner

*Primary Examiner* — Gary Harris
(74) *Attorney, Agent, or Firm* — Knobbe, Martens, Olson & Bear LLP

(57) ABSTRACT

A fuel cell system having improved driving performance is disclosed. The fuel cell system includes a stack, which may include a membrane electrode assembly, a separator and end plates provided on the both sides of the stacked membrane electrode assembly and the separator. The membrane electrode assembly may include an anode electrode, a cathode electrode, and an electrolyte membrane. The separator may be positioned with respect to the anode electrode and the cathode electrode, respectively. The end plate may include an oxidant inlet configured to supply oxidant to the cathode electrode, an unreacted oxidant outlet configured to output the unreacted oxidant from the cathode electrode, and a absorption member in fluid communication between the oxidant inlet and the unreacted oxidant outlet.

16 Claims, 6 Drawing Sheets

FUEL CELL SYSTEM AND STACK THEREOF

CROSS-REFERENCE TO RELATED APPLICATIONS

This application claims priority to and the benefit of Korean Patent Application No. 10-2010-0068511 filed in the Korean Intellectual Property Office on Jul. 15, 2010, the entire contents of which are incorporated herein by reference.

BACKGROUND

1. Field of the Disclosure

The described technology relates generally to a fuel cell system with the improved driving performance and a stack thereof.

2. Description of the Related Technology

A polymer electrolyte membrane fuel cell (PEMFC) system uses a polymer electrolyte membrane having a hydrogen ion exchange characteristic to generate electric power and heat. The electric power and heat are generated by an electrochemical reaction selectively transporting oxygen mixed with the air and hydrogen generated by reforming hydrocarbon fuel, such as methanol, natural gas, and the like to the polymer electrolyte membrane. The fuel cell system includes a stack formed by a plurality of unit cells, end plates on the both side of the stacked unit cells, a fuel supply unit, and oxidant supply unit.

The unit cell includes a separator and a membrane electrode assembly (MEA) that forms an anode electrode and a cathode electrode on the both sides of the polymer electrolyte membrane to selectively transport the hydrogen ions. The anode electrode and cathode electrode each include a catalytic layer on the electrolyte membrane, and a gas diffusion layer on the catalytic layer. The separator has a fuel pathway that supplies fuel to the anode electrode by connecting to the fuel supply unit, and the oxidant pathway that supplies oxidant to the cathode electrode by connecting to the oxidant supply unit. In addition, the separator allows the anode electrode and the cathode electrode of neighboring MEAs to be electrically connected in a parallel.

To improve the performance and durability of the stack a uniform supply of fuel, minimum temperature deviation, humidification and improved material movement in the stack are required. In addition, to maintain humidification of the stack and simplify the configuration of the fuel cell system including a balance of plant (BOP), a system for non-humidifying driving of the fuel cell system is required. However, when the existing fuel cell system is driven by a non-humidifying system, a delaminating phenomenon of the catalytic layer appears in a fuel inflow part. In other words, the catalytic layer deteriorates due to the non-humidifying driving, and is physically damaged due to the repetition of the humidifying driving and the non-humidifying driving.

SUMMARY OF CERTAIN INVENTIVE ASPECTS

In one aspect, a fuel cell system is provided having advantages of implementing a non-humidifying driving without damaging a catalytic layer.

In another aspect, a fuel cell system is provided, which is configured to control a degree of humidification when driving at a high temperature.

In another aspect, a method of driving a fuel cell system is provided. In some embodiments, non-humidifying driving may be implemented without the damage to first and second catalytic layers of a fuel cell stack by including water from outputted unreacted oxidant in an in-flowed oxidant. In some embodiments, an oxidant inlet and an unreacted oxidant outlet are in fluid communication with each other using an absorption member mixed with an end plate. In some embodiments, the absorption member is configured to control the degree of humidification by increasing or maintaining the degree of the humidification when driving at the high temperature.

In another aspect, a method of driving a fuel cell system is provided. In some embodiments, non-humidifying driving may be implemented without damage to first and second catalytic layers by including water from the outputted unreacted oxidant or unreacted fuel in an in-flowed oxidant or fuel. In some embodiments, a fuel inlet, an unreacted oxidant outlet, an oxidant inlet, and an unreacted fuel outlet are in fluid communication with each other via an absorption member.

In another aspect, a fuel cell stack for a fuel cell system includes, for example, a membrane electrode assembly (MEA) including an anode electrode, a cathode electrode, and an electrolyte membrane sandwiched between the anode electrode and the cathode electrode, an anode separator positioned on an anode electrode side of the MEA, a cathode separator positioned on the cathode electrode side of the MEA and end plates that are provided on the both sides of the MEA, the anode separator and the cathode separator.

In some embodiments, at least one of the end plates includes, for example, an oxidant inlet configured to supply oxidant to the cathode electrode, an unreacted oxidant outlet configured to output unreacted oxidant from the cathode electrode, and an absorption member in fluid communication with the oxidant inlet and the unreacted oxidant outlet. In some embodiments, at least one of the end plates includes, for example, a slot housing the absorption member. In some embodiments, the oxidant inlet and the unreacted oxidant outlet are in fluid communication with the slot. In some embodiments, the absorption member in the slot forms a first concave groove and a second concave groove that are positioned to line an inner side of the oxidant inlet and an inner side of the unreacted oxidant outlet in the stacking direction.

In some embodiments, the absorption member in the slot protrudes in an inner side of the oxidant inlet and an inner side of the unreacted oxidant outlet, respectively, so that a first hole and a second hole are formed. In some embodiments, the first hole and the second hole are smaller than the oxidant inlet and the unreacted oxidant outlet, respectively. In some embodiments, the anode electrode includes, for example, a first catalytic layer and a first gas diffusion layer. In some embodiments, the cathode electrode includes, for example, a second catalytic layer and a second gas diffusion layer. In some embodiments, the electrolytic membrane is positioned between the first catalytic layer and the second catalytic layer. In some embodiments, the oxidant inlet is in fluid communication with the second gas diffusion layer and the second catalytic layer to be in-flowed with the oxidant. In some embodiments, the unreacted oxidant outlet is in fluid communication with the second gas diffusion layer and the second catalytic layer for outputting the unreacted oxidant.

In some embodiments, the at least one of the end plates includes, for example, a fuel inlet that is configured to supply fuel to the first gas diffusion layer and the first catalytic layer and the unreacted fuel outlet configured for outputting unreacted fuel from the first gas diffusion layer and the first catalytic layer. In some embodiments, the slot is provides fluid communication between the fuel inlet and the unreacted oxidant outlet. In some embodiments, the absorption member in the slot forms a third concave groove and a fourth concave groove that are positioned to line an inner side of the fuel inlet and an inner side of the unreacted fuel outlet in the stacking direction. In some embodiments, the absorption member is formed of one or more polymers selected from the group including a polyvinyl alcohol-based resin, a polyalkylene oxide resin, and an acrylate-based resin, or copolymer thereof. In some embodiments, the absorption member in the slot protrudes in an inner side of the fuel inlet and an inner side of the unreacted fuel outlet, respectively, so that a third hole and a fourth hole are formed. In some embodiments, the third hole and the fourth hole are smaller than the fuel inlet and the unreacted fuel outlet, respectively. In some embodiments, the slot fluidly connects the oxidant inlet, the unreacted oxidant outlet, the fuel inlet, and the unreacted oxidant outlet.

In another aspect, a fuel cell system includes, for example, a fuel supply unit, an oxidant supply unit, and a fuel cell stack configured to receive fuel from the fuel supply unit, configured to receive oxidant from the oxidant supply unit, and configured to generate electric power and heat by an electrochemical reaction of the fuel and the oxidant.

In some embodiments, the stack includes a plurality of stacked unit cells. In some embodiments, each of the stacked unit cells includes, for example, a membrane electrode assembly and a separator arranged on either side of the membrane electrode assembly. In some embodiments, end plates are provided on opposite sides of the stacked unit cells. In some embodiments, at least one of the end plates includes an oxidant inlet in fluid communication with the oxidant supply unit. In some embodiments, the at least one of the end plates includes an unreacted oxidant outlet configured to output unreacted oxidant from the unit cells. In some embodiments, the oxidant inlet and the unreacted oxidant outlet are in fluid communication with each other via an absorption member.

In some embodiments, the at least one of the end plates forms a slot housing the absorption member by forming in the right angle to the stacking direction of the unit cells. In some embodiments, the oxidant inlet and the unreacted oxidant outlet are in fluid communication with the slot. In some embodiments, the absorption member in the slot forms a first concave groove and a second concave groove in a straight line, respectively, to an inner side of the oxidant inlet and an inner side of the unreacted oxidant outlet in the stacking direction. In some embodiments, the absorption member in the slot protrudes at an inner side of the oxidant inlet and an inner side of the unreacted oxidant outlet, so that a first hole and a second hole are formed. In some embodiments, the first hole and the second hole are smaller than the oxidant inlet and the unreacted oxidant outlet, respectively.

In some embodiments, the at least one of the end plates includes, for example, a fuel inlet configured to supply fuel to the unit cells from the fuel supply unit. In some embodiments, the unreacted fuel outlet is configured to output unreacted fuel from the unit cells. In some embodiments, the slot fluidly connects the fuel inlet with the unreacted oxidant outlet. In some embodiments, the absorption member in the slot forms a third concave groove and a fourth concave groove connected in the straight line, respectively, to an inner side of the fuel inlet and an inner side of the unreacted fuel outlet in the stacking direction. In some embodiments, the absorption member is formed of one or more polymers selected from the group including the polyvinyl alcohol-based resin, the polyalkylene oxide resin, and the acrylate-based resin, or copolymer thereof. In some embodiments, the absorption member in the slot protrudes at an inner side of the fuel inlet and an inner side of the unreacted fuel outlet, respectively, so that a third hole and a fourth hole are formed. In some embodiments, the third hole and the fourth hole are smaller than the fuel inlet and the unreacted fuel outlet.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
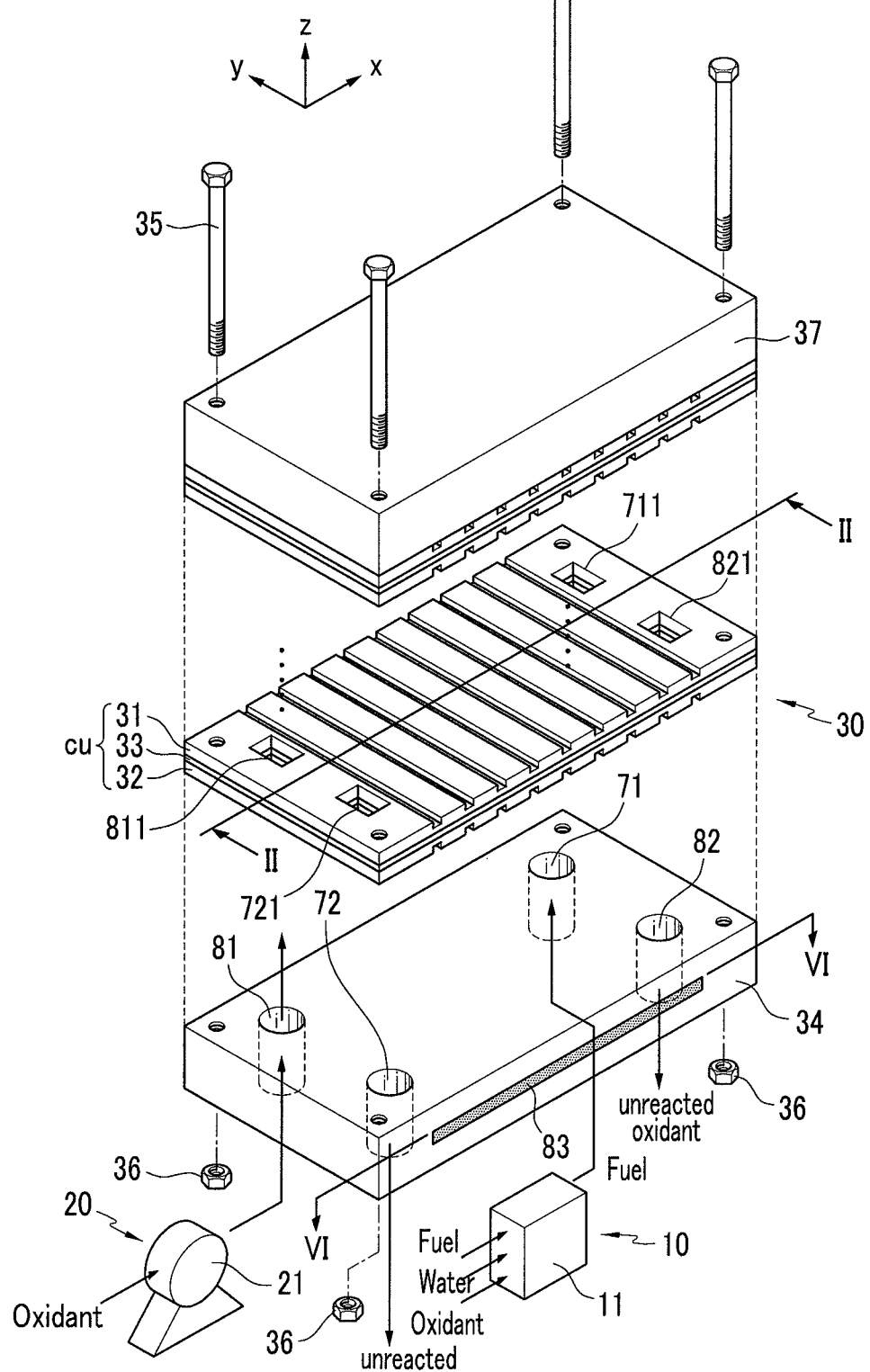
FIG. 1 is an exploded perspective view of a fuel cell system and a stack thereof according to the first exemplary embodiment.

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Similarly, when it is described that an element is "coupled" to another element, the another element may be "directly coupled" to the other element or "electrically coupled" to the other element through a third element. Parts not related to the description are omitted for clarity. Hereinafter, like reference numerals refer to like elements. Certain embodiments will be described in more detail with reference to the accompanying drawings, so that a person having ordinary skill in the art can readily make and use aspects of the present disclosure.

FIG. 1 is an exploded perspective view of a fuel cell system and a stack thereof according to a first exemplary embodiment. Referring to FIG. 1, the fuel cell system includes a fuel supply unit 10 configured to supply fuel including hydrogen, an oxidant supply unit 20 configured to supply oxidant, for example air including oxygen, and a stack 30 configured to generate electric power and heat by an electrochemical reaction of the hydrogen and oxygen.

For example, the fuel supply unit 10 is configured to supply hydrogen gas to the stack. The hydrogen gas may be generated by reforming a liquid fuel in the reformer 11 using water, oxidant (for example, air), and the liquid fuel, optionally including hydrogen, such as methanol, ethanol, or natural gas supplied by driving a fuel pump (now shown). The fuel supply unit 10 may be configured to directly supply the liquid fuel including hydrogen to the stack, and the reformer may be not required at this configuration (not shown). For convenience, the hydrogen gas or reformed gas supplied from the fuel supply unit 10 to the stack 30 is referred to as the fuel. Thus, the fuel supply unit 10 is configured to supply the hydrogen gas to the stack 30.

The oxidant supply unit 20 is configured to supply oxidant to the stack 30 by driving the oxidant pump 21. The oxidant supplied from the oxidant supply unit 20 and the fuel supplied from the fuel supply unit 10 may be independently supplied to and independently circulated in the stack 30 to cause oxidation-reduction reaction.

Figure 2:
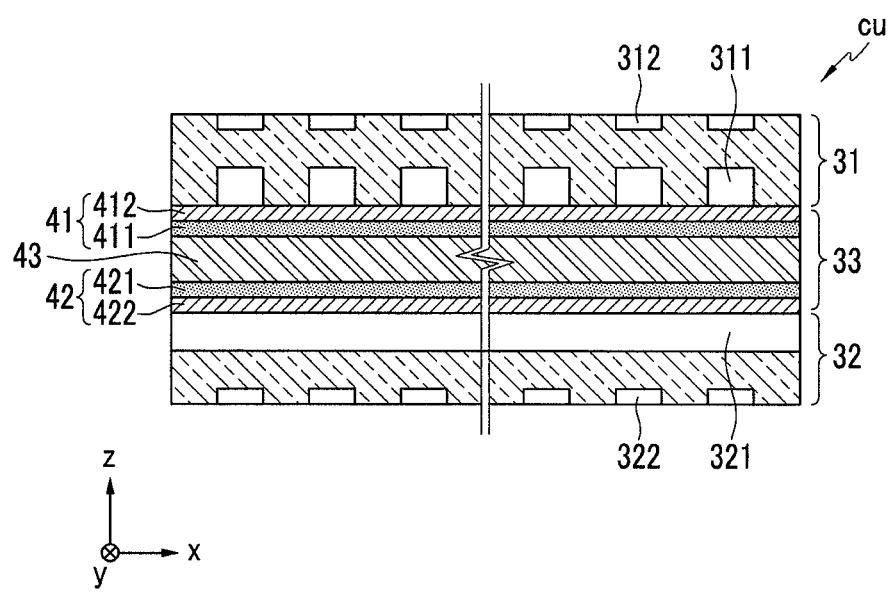
FIG. 2 is a longitudinal-sectional view of the portion of the unit cell cut along II-II line of FIG. 1.

FIG. 2 is a longitudinal-sectional view of the portion of the unit cell cut along II-II line of FIG. 1. Referring to FIG. 1 and FIG. 2, the stack 30 includes a plurality of unit cells stacked with one another and each including a membrane electrode assembly (hereinafter called as "MEA") 33, a first separator (hereinafter called as "anode-side separator") 31 and a second separator (hereinafter called as "cathode-side separator") 32 and end plates 34 and 37 that are located on opposite ends of a body formed by the plurality of unit cells. The anode-side separator 31, the MEA 33 and the cathode-side separator 32 are stacked in the z-axis direction to be formed the unit cell CU. The MEA 33 includes a polymer electrolyte membrane 43 configured to exchange hydrogen ions, and an anode electrode 41 and a cathode electrode 42 provided on opposite sides of the electrolyte membrane 43.

Figure 3:
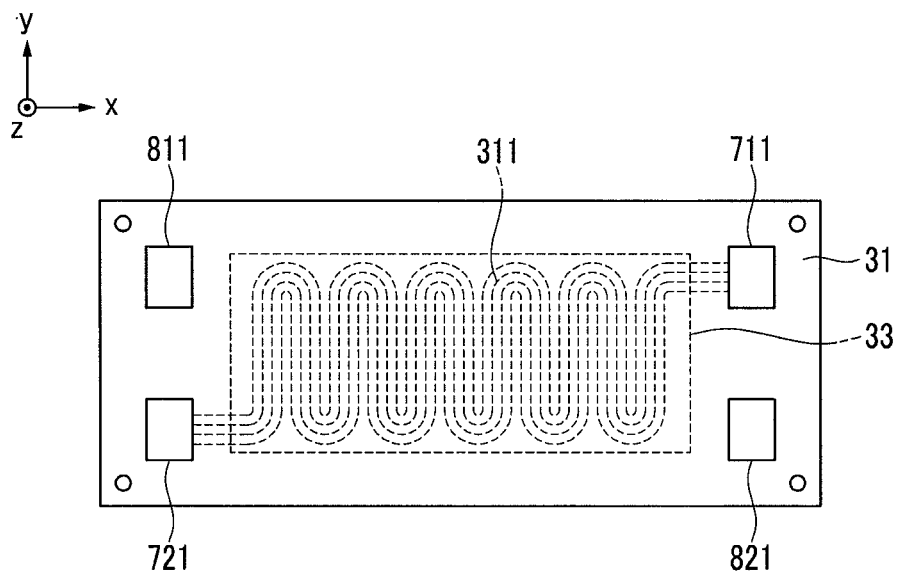
FIG. 3 is a top plan view showing the location relationship of MEA toward the fuel inflow manifold and unreacted fuel outflow manifold, and fuel pathway of the anode-side separator of FIG. 2.

FIG. 3 is a top plan view showing the location relationship of the MEA with respect to the fuel inflow manifold and unreacted fuel outflow manifold, and fuel pathway of the anode-side separator of FIG. 2. Referring to FIG. 2 and to FIG. 3, the anode electrode 41 includes a first catalytic layer 411 and a first gas diffusion layer 412 sequentially provided on one side of the electrolytic membrane 43. The anode-side separator 31 is configured to supply the fuel to the first catalytic layer 411 and the first gas diffusion layer 412 of the anode electrode 41 of the MEA 33 through the fuel pathway 311. The anode-side separator 31 includes a cooling water channel 312 on the opposite side of the fuel pathway 311 and then makes a cooling fluid, such as a cooling water to be flowed.

Figure 4:
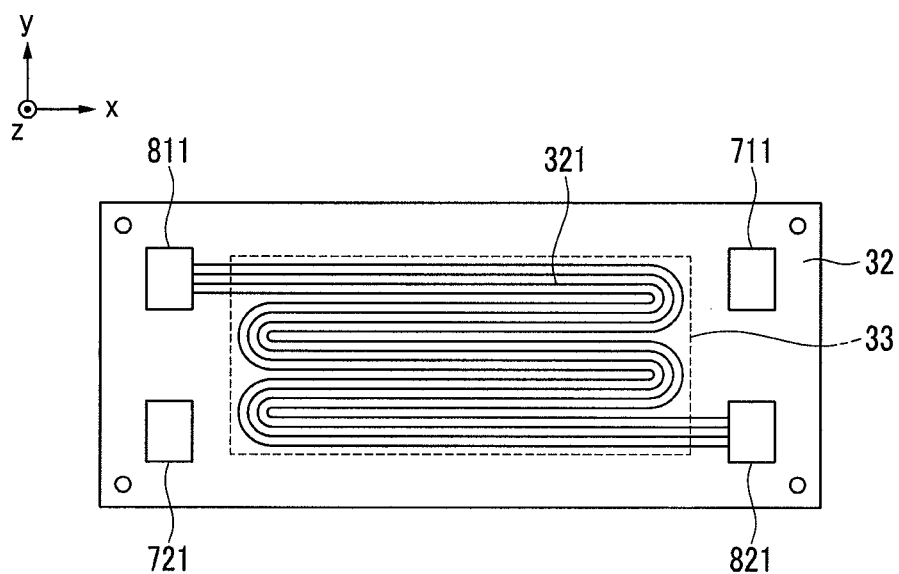
FIG. 4 is a top plan view showing the location relationship of MEA toward the oxidant inflow manifold and unreacted oxidant outflow manifold, and oxidant pathway of the cathode-side separator of FIG. 2.

FIG. 4 is a top plan view showing the location relationship of the MEA toward the fuel inflow manifold and unreacted fuel outflow manifold of the cathode-side separator, and connecting pathway of FIG. 2. Referring to FIG. 2 and to FIG. 4, the cathode electrode 42 includes a second catalytic layer 421 and a second gas diffusion layer 422 sequentially provided on another side of the electrolytic membrane 43. The cathode-side separator 32 is configured to supply oxidant to the second catalytic layer 421 and the second gas diffusion layer 422 of the cathode electrode 42 through the oxidant pathway 321 on the opposite side of the anode electrode 41. The cathode-side separator 32 includes the cooling water channel 322 on the opposite side of the oxidant pathway 321. The cooling water channel 322 is configured to allow a cooling fluid, such as the cooling water to flow therein.

Figure 5:
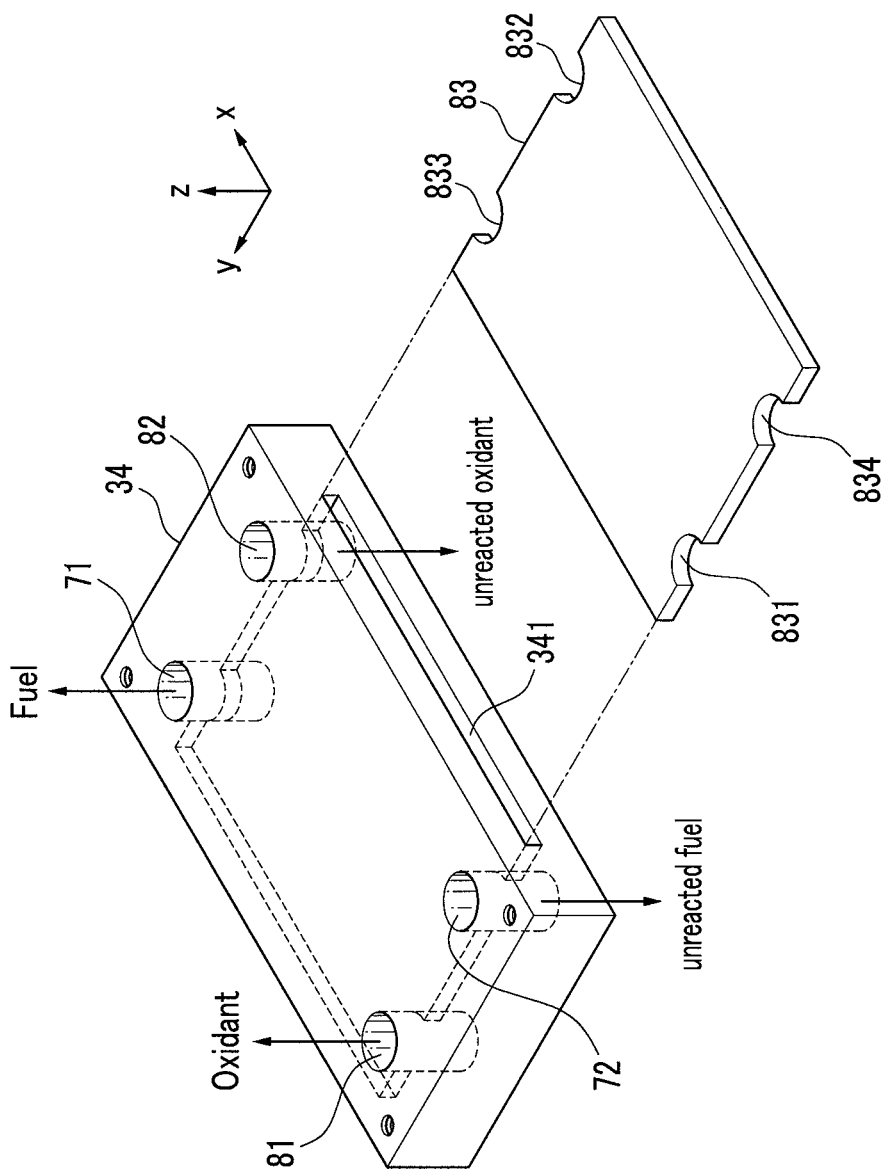
FIG. 5 is an exploded perspective view of the absorption member and end plate of FIG. 1.

FIG. 5 is an exploded perspective view of the absorption member 83 and end plate of FIG. 1. Referring to FIG. 1 and to FIG. 5, the end plates 34 and 37 are provided on opposite sides of the stacking direction (z-axis direction) stacked with a plurality of unit cells CU to form both ends of the stack 30. The stack 30 is held together by fastening bolts 35 and nuts 36.

One-side end plate 34 includes an absorption member 83 configured to supply water including the unreacted oxidant with the newly in-flowed oxidant. The end plate 34 also may be configured to supply water including the unreacted oxidant with the newly in-flowed fuel through the absorption member 83. The end plate 34 also may be configured to supply water mixed with the unreacted fuel with the newly in-flowed oxidant through the absorption member 83. In addition, the end plate 34 also may supply water mixed with the unreacted fuel with the newly in-flowed fuel through the absorption member 83.

The end plate 34 includes a fuel inlet 71 configured to supply fuel to the fuel pathway 311 of the anode-side separator 31, which is in fluid communication with the fuel supply unit 10, an unreacted fuel outlet 72 that outputs the unreacted fuel from the fuel pathway 311, an oxidant inlet 81 configured to supply oxidant to the oxidant pathway 321 of the cathode-side separator 32, which is in fluid communication with the oxidant supply unit 20, and an unreacted oxidant outlet 82 that outputs the unreacted oxidant from the oxidant pathway 321.

Meanwhile, referring to FIG. 3, the anode-side separator 31 includes a fuel inflow manifold 711, an unreacted fuel output manifold 721, an oxidant inflow manifold 811 and an unreacted oxidant output manifold 821, which pass through in the stacking direction (z-axis direction) from the outside. The fuel inflow manifold 711 is configured to allow fuel to flow into the fuel pathway 311 from the fuel inlet 71. The unreacted fuel output manifold 721 is configured to allow the unreacted fuel to flow from the fuel pathway 311 to the unreacted fuel outlet 72. The outputted unreacted fuel may include water generated during the electrochemical reactions occurring within the fuel cell stack.

Referring to FIG. 4, the cathode-side separator 32 includes a fuel inflow manifold 711, an unreacted fuel output manifold 721, an oxidant inflow manifold 811, and an unreacted oxidant output manifold 821, which pass through in the stacking direction (z-axis direction) from the outside. The oxidant inflow manifold 811 is configured to allow oxidant to flow from the oxidant inlet 81 to the oxidant pathway 321. The unreacted oxidant output manifold 821 is configured to allow the unreacted oxidant to flow from the oxidant pathway 321 to the unreacted oxidant outlet 82. The outputted unreacted oxidant may include water generated during the electrochemical reactions occurring within the fuel cell stack.

The fuel inflow manifold 711, the unreacted fuel output manifold 721, the oxidant inflow manifold 811, and the unreacted oxidant output manifold 821 each fluidly connect the anode-side separator 31 and the cathode-side separator 32 in the z-axis direction, respectively.

Again, referring to FIG. 5, the end plate 34 may be configured to supply the fuel to the unit cells CU through the fuel inlet 71, output the unreacted fuel to the unreacted fuel outlet 72 from the unit cells CU, supply oxidant to the unit cells CU through the oxidant inlet 81, and output the unreacted oxidant to the unreacted oxidant outlet 82 from the unit cells CU.

Furthermore, the absorption member 83 of the end plate 34 may be configured to supply the mixture of water and the unreacted oxidant that is outputted through the unreacted oxidant outlet 82 to the unit cells CU by re-inflowing the mixture through the oxidant inlet 81. The oxidant inlet 81 and then the unreacted oxidant outlet 82 are in fluid communication with each other. Therefore, during operation, the first and second catalytic layers 411 and 421 do not require a special humidifying, and also the damage of the first and second catalytic layers 411 and 421 may be prevented when the system is being operated in a non-humidifying mode.

Describing in more detail with reference to FIG. 2, FIG. 3 and to FIG. 5, the end plate 34 includes the fuel inlet 71. The fuel inlet 71 is configured to supply the fuel to the first catalytic layer 411 and the first gas diffusion layer 412 through the fuel pathway 311 of the anode electrode 41. The unreacted fuel outlet 72 configured to allow unreacted fuel to flow out of the stack from the fuel pathway 311. In addition, the end plate 34 includes the oxidant inlet 81, which is configured to supply the oxidant from outside the stack to the second catalytic layer 421 and the second gas diffusion layer 422 through the oxidant pathway 321 of the cathode electrode 42. The unreacted oxidant outlet 82 is configured to allow unreacted oxidant to flow out of the stack from the oxidant pathway 321. The absorption member 83 is configured to supply water mixed with the unreacted oxidant that is outputted to the unreacted oxidant outlet 82 to the second catalytic layer 421 and the second gas diffusion layer 422 through the oxidant inlet 81 through a fluid connection between the oxidant inlet 81 and the unreacted oxidant outlet 82.

Figure 6:
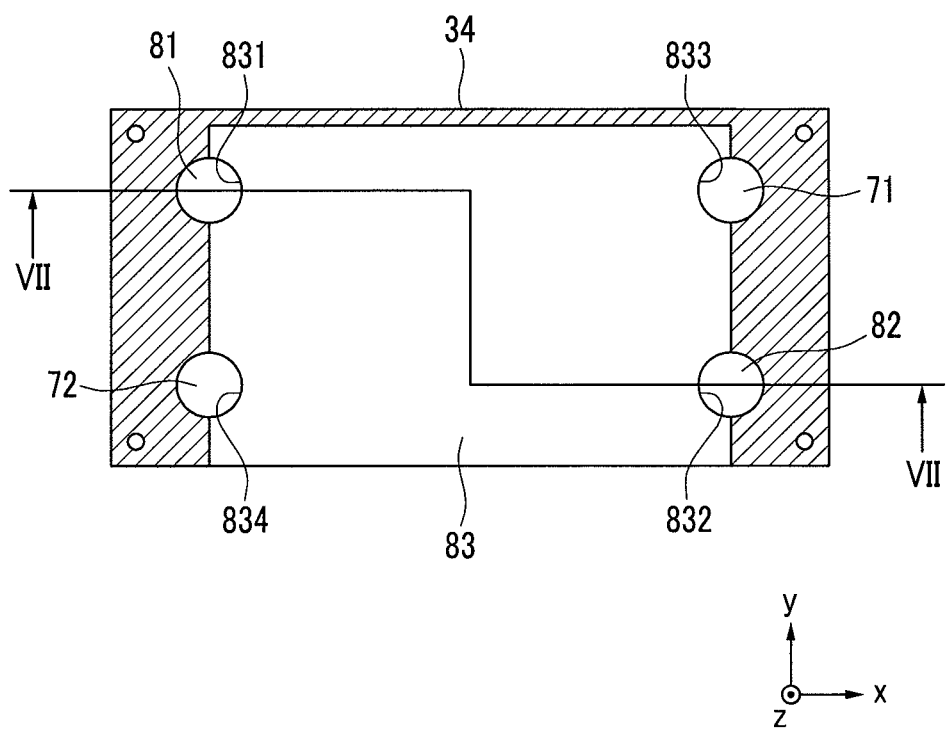
FIG. 6 is a cross-sectional view cut along VI-VI line of FIG. 1.
Figure 7:
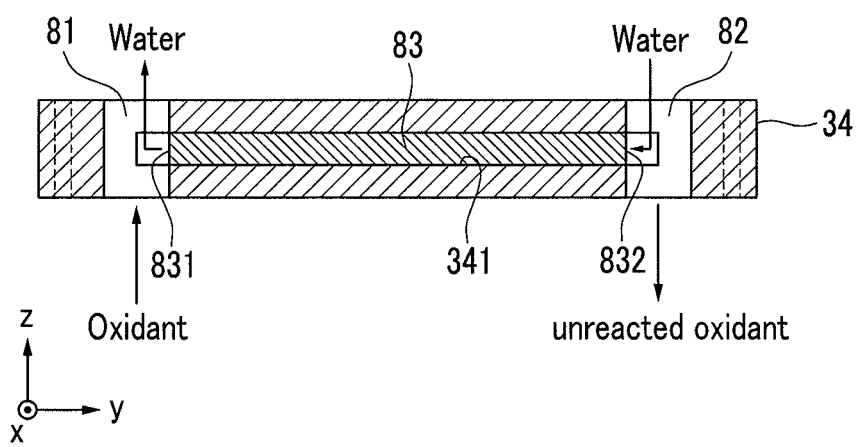
FIG. 7 is a longitudinal-sectional view cut along VII-VII line of FIG. 6.

FIG. 6 is a cross-sectional view cut along VI-VI line of FIG. 1. FIG. 7 is a longitudinal-sectional view cut along VII-VII line of FIG. 6. Referring to FIG. 6 and to FIG. 7, the end plate 34 includes a slot 341 in approximately a right angle (xy plane) direction to the stacking direction (z-axis direction) of the unit cells CU. The slot 341 is configured to house the absorption member 83.

The slot 341 is in fluid communication with the oxidant inlet 81 and the unreacted oxidant outlet 82. The slot 341 is thus configured to allow the absorption member 83 to absorb the water mixed with the unreacted oxidant that is outputted to the unreacted oxidant outlet 82 and then supply the water to the oxidant inlet 81. The absorption member 83 is inserted into the slot 341 and is configured to supply the water in the unreacted oxidant with the oxidant through at least oxidant inlet 81 and the unreacted oxidant outlet 82 without the interruption of the flow in the z-axis direction of the oxidant and the unreacted oxidant.

The absorption member 83 may thus include the first concave groove 831 and the second concave groove 832 in fluid communication with, respectively, an inner side of the oxidant inlet 81 and an inner side of the unreacted oxidant outlet 82 in the stacking direction (z-axis direction). Therefore, the water mixed with the unreacted oxidant that is outputted to the unreacted oxidant outlet 82 may be absorbed in the absorption member 83 through the second concave groove 832, and then may be supplied to the first concave groove 831 and the oxidant inlet 81 to be supplied with the oxidant. Thus, non-humidifying driving of the fuel cell stack may be implemented, a degree of the humidification may be increased when driving at a high temperature, or a degree of the humidification may be maintained.

In the end plate 34 and the absorption member 83, the unreacted oxidant outlet 82 is in fluid communication with the fuel inlet 71, as shown in FIG. 5 and FIG. 6. In other words, the water mixed with the unreacted oxidant may be absorbed through the unreacted oxidant outlet 82 and the second concave groove 832 of the absorption member 83, and then supplied together with the newly in-flowed fuel through the fuel inlet 81 and the third concave groove 833 of the absorption member 83.

In the exemplary embodiment, the slot 341 fluidly connects the oxidant inlet 81, the unreacted oxidant outlet 82, the fuel inlet 71, and the unreacted fuel outlet 72 with each other. The absorption member 83 is thus configured to supply the water mixed with the unreacted fuel with oxidant or the fuel by absorbing the water mixed with the unreacted fuel through the oxidant inlet 81, the unreacted oxidant outlet 82, the fuel inlet 71, and the unreacted fuel outlet 72, without interrupting the flow of oxidant, the unreacted oxidant, the fuel, or the unreacted fuel, respectively, in the z-axis direction.

The absorption member 83 also forms the third concave groove 833 and the fourth concave groove 834 that are connected in the straight line, respectively, to inner side of the fuel inlet 71 and the unreacted fuel outlet 72 in the stacking direction (z-axis direction). Therefore, the water mixed with the unreacted fuel outputted to the unreacted fuel outlet 72 may be absorbed to the absorption member 83 through the fourth concave groove 834, supplied to the first concave groove 831 and the oxidant inlet 81, and then supplied to the second gas diffusion layer 721 of the cathode electrode 41 with the oxidant. In addition, the water mixed with the unreacted fuel outputted to the unreacted fuel outlet 72 may be absorbed to the absorption member 83 through the fourth concave groove 834, supplied to the third concave groove 833 and the fuel inlet 71, and then supplied to the first catalytic layer 411 and the first gas diffusion layer 412 of the anode electrode 41 with the fuel. Thus, non-humidifying driving of the fuel cell stack may be implemented without damaging the first catalytic layer 411. Further, a degree of the humidification may be controlled when driving the fuel cell stack at high temperatures.

Meanwhile, the absorption member 83 fluidly connects the fuel inlet 71, the unreacted oxidant outlet 82, the oxidant inlet 81, and the unreacted fuel outlet 72 with each other. Thus, the absorption member 83 is configured to supply the water mixed with the unreacted oxidant or unreacted fuel to the second catalytic layer 421 and the second gas diffusion layer 422 of the cathode electrode 42 with the oxidant. For this reason, the non-humidifying driving of the fuel cell stack may be implemented without damaging the second catalytic layer 422. Further, a degree of the humidification may be controlled when driving the fuel cell stack at the high temperatures.

The absorption member 83 may be formed of an absorption polymer. For example, the absorption member 83 may be formed of one or more polymers selected from the group including, for example, a polyvinyl alcohol-based resin, a polyalkylene oxide resin, and an acrylate-based resin, or copolymer thereof.

Absorption properties of the absorption member 83 may be expressed by measuring the water content rate as weight. For example, the water content rate may be measured by measuring the change of the weight while temperature is maintained at 100° C. (an isothermal reaction) using a thermo gravimetic analyzer (TGA).

Hereinafter, when describing the second exemplary embodiment, features that are similar to those of the first exemplary embodiment will not be described.

Figure 8:
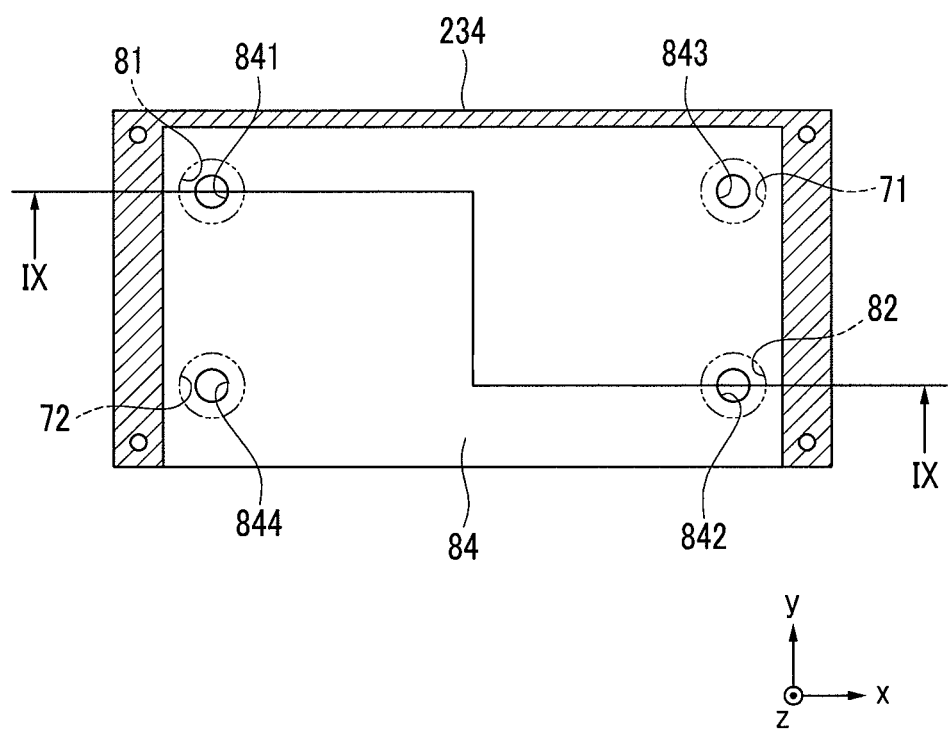
FIG. 8 is a cross-sectional view of a fuel cell system and an end plate of a stack according to the second exemplary embodiment.
Figure 9:
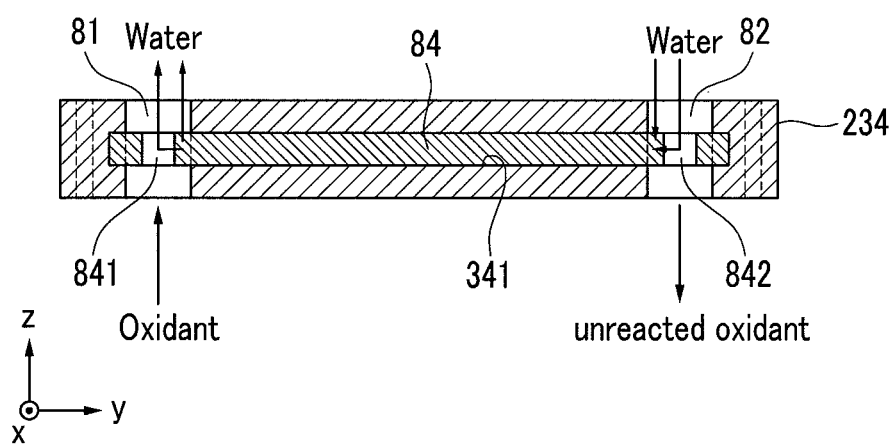
FIG. 9 is a cross-sectional view cut along IX-IX line of FIG. 8.

FIG. 8 is a cross-sectional view of a fuel cell system and an end plate of a stack according to the second exemplary embodiment. FIG. 9 is a cross-sectional view cut along IX-IX line of FIG. 8. Referring to FIG. 8 and to FIG. 9, the absorption member 84 is positioned within the slot 341 so as to slightly protrude into an inner side of the oxidant inlet 81 and an inner side of the unreacted oxidant outlet 82 in the end plate 234 in the stacking direction (z-axis direction), respectively. Thus, the absorption member 81 forms a first hole 841 and a second hole 842, which are smaller than the oxidant inlet 81 and the unreacted oxidant outlet 82, respectively. Therefore, in the end plate 234, the water mixed with the unreacted oxidant that is outputted to the unreacted oxidant outlet 82 may be absorbed to the absorption member 84 through the second hole 842, supplied to the oxidant inlet 71, and then supplied to the second catalytic layer 421 and the second gas diffusion layer 422 of the cathode electrode 42 together with the oxidant. The absorption member 84 forms both the first hole 841 and the second hole 842, which are smaller than the oxidant inlet 81 and the unreacted oxidant outlet 82, respectively. Therefore, in operation of the fuel cell stack, the absorption member 84 partially increases the resistance of the oxidant inflow and the unreacted oxidant output in a z-direction, but more effectively collects the water mixed with the unreacted oxidant that is outputted to the unreacted oxidant outlet 82 when compared with the configuration of the first exemplary embodiment. Thus, during operation of the fuel cell stack, the absorption member 84 may effectively supply water to the oxidant that is in-flowed to the oxidant inlet 71.

For the exemplary embodiments of the present disclosure, the absorption member 84 may be positioned so as to slightly protrude into the inner side of the fuel inlet 71 and the inner side of the unreacted fuel outlet 72, respectively, in the stacking direction (z-axis direction). The absorption member 84 may thus form a third hole 843 and a fourth hole 844, which are smaller than the fuel inlet 71 and the unreacted fuel outlet 72, respectively. Therefore, in operation of the fuel cell stack, the water mixed with the unreacted fuel that is outputted to the unreacted fuel outlet 72 may be absorbed to the absorption member 84 through the fourth hole 844, supplied to the fuel inlet 71, and then supplied to the first catalytic layer 411 and the first gas diffusion layer 412 of the anode electrode 41 along with the fuel. The absorption member 84 forms the third hole 843 and the fourth hole 844, which are smaller than the fuel inlet 71 and the unreacted fuel outlet 72, respectively. Therefore, in operation of the fuel cell stack, the absorption member 84 partially increases the resistance of the fuel inflow and the unreacted fuel output, but more effectively collects the water mixed with the unreacted fuel that is outputted to the unreacted fuel outlet 72, and then can effectively supply to the fuel that is in-flowed to the fuel inlet 71.

The slot 341 and the absorption member 84 fluidly connects the oxidant inlet 81, the unreacted oxidant outlet 82, the fuel inlet 71, and the unreacted fuel outlet 72 with each other, so that during operation of the fuel cell stack they are configured to supply the water mixed with the oxidant or unreacted fuel with the newly inflow oxidant or fuel without the interruption of the flows of the oxidant, the unreacted oxidant, the fuel and the unreacted fuel, respectively, in the z-axis direction.

While this disclosure has been described in connection with what are presently considered to be practical exemplary embodiments, it will be appreciated by those skilled in the art that various modifications and changes may be made without departing from the scope of the present disclosure. It will also be appreciated by those of skill in the art that parts mixed with one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A fuel cell stack for a fuel cell system, comprising:
a plurality of unit cells stacked with one another and each including a membrane electrode assembly (MEA), an anode separator and a cathode separator, wherein the MEA includes an anode electrode, a cathode electrode, and an electrolyte membrane sandwiched between the anode electrode and the cathode electrode, wherein the anode separator is positioned on an anode electrode side of the MEA, and wherein the cathode separator is positioned on the cathode electrode side of the MEA; and
end plates that are located on opposite ends of a body formed by the plurality of unit cell,
wherein at least one of the end plates comprises an oxidant inlet configured to supply oxidant to the cathode electrode, an unreacted oxidant outlet configured to output unreacted oxidant from the cathode electrode, and a slot housing an absorption member in fluid communication with the oxidant inlet and the unreacted oxidant outlet, and
wherein the absorption member in the slot forms a concave groove positioned to line either an inner side of the oxidant inlet or an inner side of the oxidant outlet.

2. The fuel cell stack of claim 1, wherein the absorption member in the slot forms a first concave groove positioned to line the inner side of the oxidant inlet and a second concave groove positioned to line the inner side of the the unreacted oxidant outlet.

3. The fuel cell stack of claim 1, wherein the absorption member in the slot protrudes in the inner side of the oxidant inlet and the inner side of the unreacted oxidant outlet, respectively, so that a first hole and a second hole are formed, wherein the first hole and the second hole are smaller than the oxidant inlet and the unreacted oxidant outlet, respectively.

4. The fuel cell stack of claim 1, wherein the anode electrode comprises a first catalytic layer and a first gas diffusion layer, wherein the cathode electrode comprises a second catalytic layer and a second gas diffusion layer, wherein the electrolytic membrane is positioned between the first catalytic layer and the second catalytic layer, wherein the oxidant inlet is in fluid communication with the second gas diffusion layer and the second catalytic layer to be in-flowed with the oxidant; and wherein the unreacted oxidant outlet is in fluid communication with the second gas diffusion layer and the second catalytic layer for outputting the unreacted oxidant.

5. The fuel cell stack of claim 4, wherein the at least one of the end plates further comprises a fuel inlet that is configured to supply fuel to the first gas diffusion layer and the first catalytic layer and the unreacted fuel outlet configured for outputting unreacted fuel from the first gas diffusion layer and the first catalytic layer, and wherein the slot being connected between the fuel inlet and the unreacted oxidant outlet.

6. The fuel cell stack of claim 5, wherein the absorption member in the slot forms a third concave groove and a fourth concave groove that are positioned to line an inner side of the fuel inlet and an inner side of the unreacted fuel outlet in the stacking direction.

7. The fuel cell stack of claim 1, wherein the absorption member is formed of one or more polymers selected from the group consisting of a polyvinyl alcohol-based resin, a polyalkylene oxide resin, and an acrylate-based resin, or copolymer thereof.

8. The fuel cell stack of claim 5, wherein the absorption member in the slot protrudes in an inner side of the fuel inlet and an inner side of the unreacted fuel outlet, respectively, so that a third hole and a fourth hole are formed, and wherein the third hole and the fourth hole are smaller than the fuel inlet and the unreacted fuel outlet, respectively.

9. The fuel cell stack of claim 5, wherein the slot fluidly connects the oxidant inlet, the unreacted oxidant outlet, the fuel inlet, and the unreacted oxidant outlet.

10. A fuel cell system, comprising:
a fuel supply unit;
an oxidant supply unit; and
a fuel cell stack fluidly connected to the fuel supply unit and fluidly connected to the oxidant supply unit,
wherein the stack comprises a plurality of stacked unit cells,
wherein each of the stacked unit cells comprises a membrane electrode assembly and a separator arranged on either side of the membrane electrode assembly;
wherein end plates are provided on opposite sides of the stacked unit cells,
wherein at least one of the end plates comprises an oxidant inlet in fluid communication with the oxidant supply unit,
wherein the at least one of the end plates comprises an unreacted oxidant outlet configured to output unreacted oxidant from the unit cells,
wherein the oxidant inlet and the unreacted oxidant outlet are in fluid communication with each other via an absorption member,
wherein the at least one of the end plates forms a slot housing the absorption member by forming in the right angle to the stacking direction of the unit cells, and wherein the oxidant inlet and the unreacted oxidant outlet are in fluid communication with the slot, and
wherein the absorption member in the slot protrudes at an inner side of the oxidant inlet or an inner side of the unreacted oxidant outlet, so that a first hole and a second hole are formed, and wherein the first hole and the second hole are smaller than the oxidant inlet and the unreacted oxidant outlet, respectively.

11. The fuel cell system of claim 10, wherein the absorption member in the slot forms a first concave groove and a second concave groove in a straight line, respectively, to an inner side of the oxidant inlet and an inner side of the unreacted oxidant outlet in the stacking direction.

12. The fuel cell system of claim 10, wherein the absorption member in the slot protrudes at an inner side of the oxidant inlet and an inner side of the unreacted oxidant outlet, so that a first hole and a second hole are formed, and wherein the first hole and the second hole are smaller than the oxidant inlet and the unreacted oxidant outlet, respectively.

13. The fuel cell system of claim 10, wherein the at least one of the end plates further comprises a fuel inlet configured to supply fuel to the unit cells from the fuel supply unit, wherein the unreacted fuel outlet is configured to output unreacted fuel from the unit cells, and wherein the slot fluidly connects the fuel inlet with the unreacted oxidant outlet.

14. The fuel cell system of claim 13, wherein the absorption member in the slot forms a third concave groove and a fourth concave groove connected in the straight line, respectively, to an inner side of the fuel inlet and an inner side of the unreacted fuel outlet in the stacking direction.

15. The fuel cell system of claim 10, wherein the absorption member is formed of one or more polymers selected from the group consisting of the polyvinyl alcohol-based resin, the polyalkylene oxide resin, and the acrylate-based resin, or copolymer thereof.

16. The fuel cell system of claim 13, wherein the absorption member in the slot protrudes at an inner side of the fuel inlet and an inner side of the unreacted fuel outlet, respectively, so that a third hole and a fourth hole are formed, and wherein the third hole and the fourth hole are smaller than the fuel inlet and the unreacted fuel outlet.

* * * * *